(12) United States Patent
Wochner et al.

(10) Patent No.: US 7,922,876 B2
(45) Date of Patent: Apr. 12, 2011

(54) METHOD FOR PROCESSING AN ETCHING MIXTURE WHICH IS FORMED DURING THE PRODUCTION OF HIGHLY PURE SILICON

(75) Inventors: Hanns Wochner, Burghausen (DE); Christian Gossmann, Emmerting (DE); Wolfgang Stoiber, Eggenfelden (DE)

(73) Assignee: Wacker Chemie AG, Munich (DE)

( * ) Notice: Subject to any disclaimer, the term of this patent is extended or adjusted under 35 U.S.C. 154(b) by 798 days.

(21) Appl. No.: 11/842,188

(22) Filed: Aug. 21, 2007

(65) Prior Publication Data

US 2008/0053815 A1    Mar. 6, 2008

(30) Foreign Application Priority Data

Aug. 31, 2006  (DE) .......................... 10 2006 040 830

(51) Int. Cl.
*B01D 3/00* (2006.01)
*C01B 33/037* (2006.01)

(52) U.S. Cl. .................... 203/13; 159/DIG. 19; 203/15; 203/71; 423/341; 423/394.2; 423/483; 423/488; 423/DIG. 1

(58) Field of Classification Search .................. 203/13, 203/15, 71; 159/DIG. 19; 423/341, 394.2, 423/483, 488, DIG. 1; 428/446; 528/10
See application file for complete search history.

(56) References Cited

U.S. PATENT DOCUMENTS

| | | | |
|---|---|---|---|
| 2,993,757 A | | 7/1961 | Dasher et al. |
| 3,848,061 A | * | 11/1974 | Laue et al. ................. 423/341 |
| 3,971,845 A | * | 7/1976 | Becker et al. ................. 423/483 |
| 4,008,130 A | * | 2/1977 | Leathers et al. ................. 203/6 |
| 4,936,955 A | * | 6/1990 | Dobson et al. ................. 203/40 |
| 5,346,557 A | | 9/1994 | Ito |
| 5,411,726 A | | 5/1995 | Bulan et al. |
| 5,603,811 A | | 2/1997 | Lucas |
| 6,309,467 B1 | | 10/2001 | Wochner et al. |

FOREIGN PATENT DOCUMENTS

| | | |
|---|---|---|
| CA | 2247586 A | 3/1999 |
| DE | 19741465 A1 | 3/1999 |
| DE | 19852242 A1 | 6/2000 |
| EP | 0 548 504 A2 | 6/1993 |
| EP | 0 610 748 A1 | 8/1994 |
| EP | 0 905 796 A1 | 3/1999 |
| FR | 2 659 956 | 9/1991 |

(Continued)

OTHER PUBLICATIONS

Patbase abstract corresponding to DE19852242A1.

(Continued)

*Primary Examiner* — Virginia Manoharan
(74) *Attorney, Agent, or Firm* — Brooks Kushman P.C.

(57) ABSTRACT

In a method for recovering acid from an aqueous etching mixture containing HF, $HNO_3$, $H_2SiF_6$ and $HNO_2$ which has been used for purifying polycrystalline silicon, the used etching mixture is distilled progressively so that approximately from 20 to 50 wt. % of the mixture is distilled off as dilute acid containing more than 90 wt. % of the silicon dissolved as hexafluorosilicic acid in a first fraction, and the water contained in the used etching mixture having been reduced by approximately 10-30 wt. %, this water-depleted mixture is then concentrated by evaporation to a residue of about 1 to 5 wt. % of the initial amount of used etching mixture during which a second fraction is distilled off, and the residue is disposed of.

20 Claims, 1 Drawing Sheet

FOREIGN PATENT DOCUMENTS

| | | |
|---|---|---|
| JP | 05154466 A | 6/1993 |
| JP | 05505556 A | 8/1993 |
| JP | 07187900 A | 7/1995 |
| JP | 9302483 | 11/1997 |
| JP | 10254115 A | 9/1998 |
| JP | 11168076 A | 6/1999 |
| WO | 02/083554 A2 | 10/2002 |
| WO | 2006126365 A1 | 11/2006 |

OTHER PUBLICATIONS

Patbase abstract corresponding to JP9-302483.
Patbase Abstract corresponding to FR2659956.
U.S. 5,411,726 corresponding to EP 0 610 748 A1.
U.S. 6,309,467 B1 corresponding to EP 0 905 796 A1.

* cited by examiner

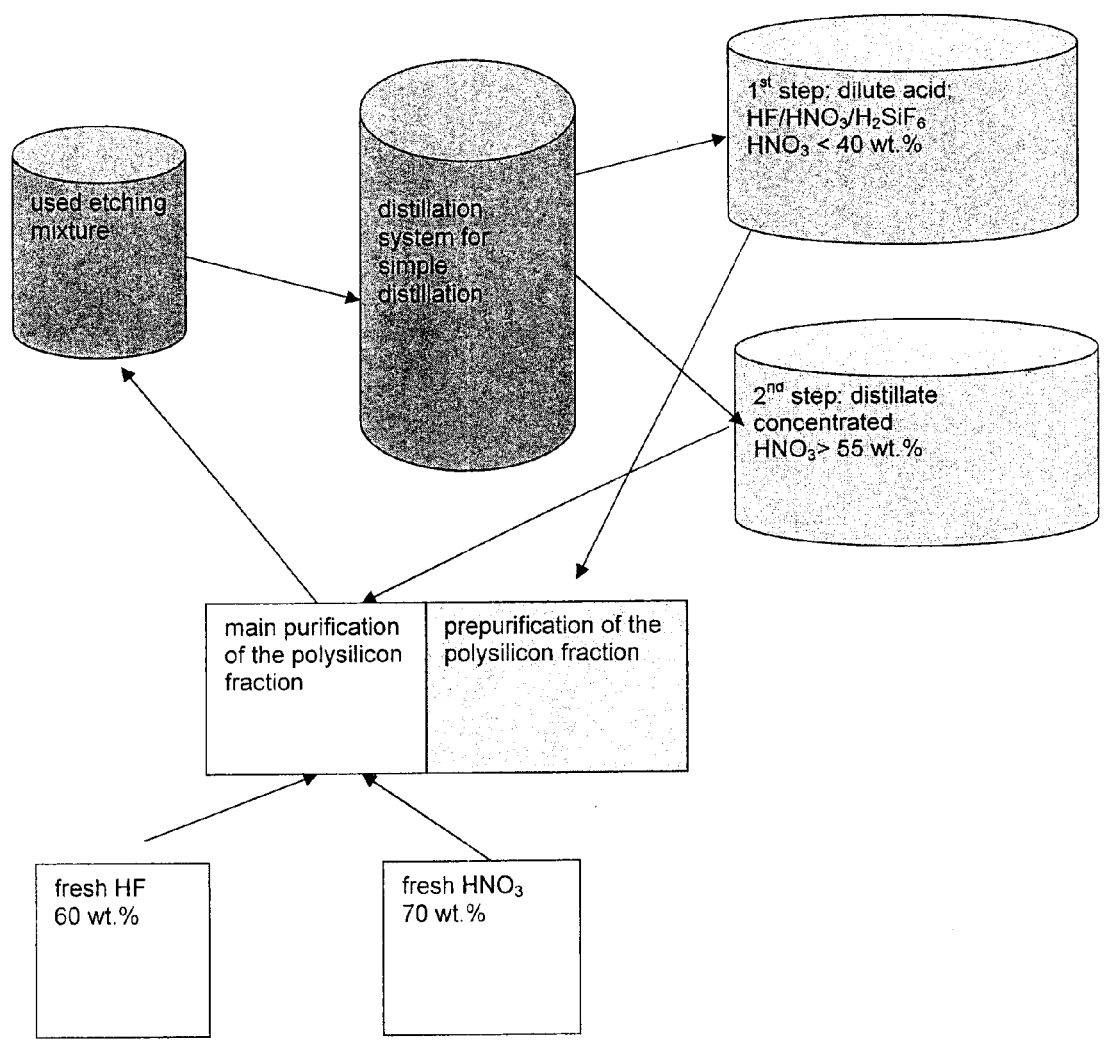

METHOD FOR PROCESSING AN ETCHING MIXTURE WHICH IS FORMED DURING THE PRODUCTION OF HIGHLY PURE SILICON

BACKGROUND OF THE INVENTION

1. Field of the Invention

The invention relates to a method for processing an etching mixture which is formed during the production of highly pure silicon.

2. Background Art

Highly pure silicon is required for the production of solar cells or electronic components, for example memory elements or microprocessors.

Various methods are known for the purification of polycrystalline silicon (polysilicon). These purification methods employ etching mixtures which contain HF and $HNO_3$, from which a mixture of the components HF, $HNO_3$, $H_2SiF_6$ and $HNO_2$ is formed during purification. The relevant prior art is described, for example in U.S. Pat. No. 6,309,467. In the past, such mixtures have generally been neutralized and disposed of. It is proposed in the abstract of JP 09302483 to recover $HNO_3$ from the used etching mixture by means of fractional distillation. Likewise methods which separate the used etching mixture into the initial substances hydrofluoric acid and nitric acid, for example by means of electrodialysis and subsequent fractional distillation, and which recycle the highly pure hydrofluoric acid and nitric acid thereby obtained back into the etching process, have been proposed. This method is too expensive and therefore uneconomical owing to the elaborate apparatus required, for example distillation columns.

SUMMARY OF THE INVENTION

It is an object of the present invention to provide a simple cost-effective method for recovering acid from an aqueous etching mixture containing HF, $HNO_3$, $H_2SiF_6$ and $HNO_2$ derived from purifying polycrystalline silicon. These and other objects are achieved by a method in which the used etching mixture is distilled progressively so that approximately from 20 to 50 wt. % of the used etching mixture is distilled off as dilute acid in a first fraction, the dilute acid containing more than 90 wt. % of the silicon dissolved as hexafluorosilicic acid and the water contained in the used etching mixture being reduced by approximately 10 to 30 wt. %, this water-depleted mixture then being concentrated by evaporation to a residue of about 1 to 5 wt. % of the initial amount of used etching mixture, the second fraction thereby distilled off being collected in a container, and the residue subsequently disposed of.

BRIEF DESCRIPTION OF THE DRAWINGS

FIG. 1 illustrates schematically one embodiment of a process of the invention.

DETAILED DESCRIPTION OF THE PREFERRED EMBODIMENT(S)

The method according to the invention can be carried out in simple and therefore cost-effective distilling apparatus, since it obviates complete separation of the used etching mixtures into the starting acids, hydrofluoric acid and nitric acid.

Two fractions are distilled off during the progressive distillation. The first fraction is preferably taken at a temperature of from 100 to 200° C., preferably over a period of from 5 to 90 min. The first fraction is taken until analysis of this fraction shows that at least 90 wt. % of the silicon initially present in the used etching mixture has been distilled off into this fraction in the form of hexafluorosilicic acid.

Preferably, the second fraction is subsequently taken preferably at a temperature of from 100 to 180° C., preferably over a period of from 2 to 80 min. The second fraction is taken until the liquid in the distillation flask has been concentrated by evaporation to a residue of about 1-5 wt. % of the initial amount of used aqueous etching mixture.

The used aqueous etching mixture to be processed preferably consists of from 40.5 to 53.9 wt. % water, 40-50 wt. % $HNO_3$, from 0.1 to 1.5 wt. % $HNO_2$, 5-6 wt. % HF and 1-2 wt. % Si in the form of $H_2SiF_6$, as well as impurities which have been introduced into the etching solution by etching the silicon.

The dilute acid obtained in the first fraction is preferably an aqueous mixture of HF, $HNO_3$ and $H_2SiF_6$ with an $HNO_3$ content <40 wt. % and a silicon content of 90 wt. % of the initial silicon content in the used etching mixture in the form of hexafluorosilicic acid. This dilute acid is either disposed of or used for prepurifying a polysilicon batch, use for prepurifying a polysilicon batch being preferred. Disposal may, for example be carried out in a fluoride precipitation system.

The distillate obtained as a second fraction consists of an $HF/HNO_3$ mixture with an $HNO_3$ content >55 wt. % and a silicon content of up to 10 wt. % of the initial silicon content in the etching mixture, i.e. less than 1 wt. % of the $HF/HNO_3$ mixture.

It has been found that the $HF/HNO_3$ mixture obtained by means of the method with an $HNO_3$ content >55 wt. %, which contains less than 10 wt. % of the amount of silicon originally present in the etching mixture in the form of hexafluorosilicic acid, can readily be used for the purification of polycrystalline silicon.

This $HF/HNO_3$ mixture is therefore preferably used for topping up during the purification of polysilicon, more preferably for topping up in the last acid cycle of the bath sequence, which contains HF and $HNO_3$, during the purification of polycrystalline silicon. By topping up with this silicon-depleted $HF/HNO_3$ mixture, the consumption of fresh hydrofluoric acid and fresh nitric acid for the purification of polysilicon can be reduced by about 20-50 wt. %.

The invention therefore also relates to a method for purifying polycrystalline silicon, comprising prepurification and main purification by means of an etching mixture containing HF and $HNO_3$, wherein the used etching mixture containing HF, $HNO_3$, $H_2SiF_6$ and $HNO_2$ is processed by means of the method according to the invention and the $HF/HNO_3$ mixture thereby obtained with an $HNO_3$ content >55 wt. % and a silicon content of less than 1 wt. % is added again to the etching mixture for the main purification of the polycrystalline silicon.

The dilute acid obtained in the first fraction step is furthermore preferably used for prepurifying the polycrystalline silicon. This particularly preferred method is schematically represented in FIG. 1. A polycrystalline silicon batch is preferably used as polycrystalline silicon.

During the separation of the second fraction by distillation, the impurities which have been introduced into the etching mixture by etching the silicon remain in the residue. The residue may, for example, be disposed of by washing with ultrapure water. The washing water is subsequently disposed of in a fluoride precipitation and denitrification system. In this case, the hydrofluoric acid is disposed of with lime milk as calcium fluoride. The nitric acid is broken down by bacteria into $N_2$.

The following examples serve to explain the invention further:

EXAMPLE 1

600 ml of a used etching mixture from the purification of crystalline polysilicon, containing 6 wt. % HF, 45 wt. % $HNO_3$, 12 wt. % $H_2SiF_6$ and 0.5 wt. % $HNO_2$, were heated and distilled in a closed distillation apparatus. For this distillation, the used etching mixture was placed in a teflon flask and heated therein to about 120° C. by means of a heating mantle with a heating power of 300 W. 5 minutes after the start of heating, the liquid began to boil. After a further 60 minutes, 250 ml of dilute acid had condensed in a collection container. 350 ml remained in the flask bottom. The composition of the two fractions was determined with the aid of the DET method described in DE 198 52 242 A1:

| Bottom product: | |
| --- | --- |
| nitric acid | 59.8 wt. % |
| hydrofluoric acid | 3.0% wt. % |
| silicon | 0.1% wt. % |
| $H_2O$ | 37.1% wt. % |
| Dilute acid: | |
| nitric acid | 39.0 wt. % |
| hydrofluoric acid | 6.9 wt. % |
| silicon | 1.4 wt. % |
| $H_2O$ | 52.7 wt. % |

The analyses of the acids carried out by the DET method in order to determine the acid concentrations showed that more than 90% of the silicon had distilled off in the first fraction.

The 350 ml of bottom product were heated for 5 minutes in a second step using a heating mantle with a power of 300 W to 120 degrees. After 60 minutes, 335 ml of distillate had been transferred into a storage container.

| Composition of the distillate | |
| --- | --- |
| nitric acid | 60 wt. % |
| hydrofluoric acid | 3 wt. % |
| silicon | 0.1 wt. % |
| water | 36.9 wt. % |

The 15 ml of residue were disposed of, in this case by dilution with 1 liter of ultrapure water and disposal via a fluoride precipitation system.

EXAMPLE 2

As described in Ex. 1, 100 l of fraction 1 (dilute acid) and 500 l of fraction 2 were produced. Fraction 2 with the more highly concentrated acid obtained in the second step at a temperature of from 100 to 180° C. was collected in a collection container. From this collection container, the mixture was added to the etching mixture for the main purification of the polysilicon fraction. In order to maintain the bath concentration of 56 wt. % $HNO_3$ and 6 wt. % HF in the etching bath, fresh highly concentrated acids of electronics quality with a content of 60 wt. % HF and 70 wt. % $HNO_3$ were also added. By supplying the distillate, the amount of fresh 60 wt. % hydrofluoric acid and 70 wt. % nitric acid are reduced by 60 wt. %. A poly batch purified by means of such an etching solution does not differ in its purity from a poly batch which was produced exclusively by means of a new etching solution.

EXAMPLE 3

As described in Ex. 1, 100 l of fraction 1 (dilute acid) and 500 l of fraction 2 were produced. The dilute acid obtained in the second step at a temperature of from 110 to 200° C. with a composition of 35 wt. % $HNO_3$, 6.9 wt. % HF and 1.4 wt. % Si is added to the acid cycle of the purification of polycrystalline silicon. Topping up with highly concentrated 60 wt. % hydrofluoric acid and 70 wt. %, as described in Example 2, is not necessary here since an $HF/HNO_3$ mixture with this concentration attacks silicon only slightly and HF and nitric acid do not therefore become consumed. A poly batch which is prepurified with such an etching solution does not differ from a poly batch which was produced exclusively by means of a fresh etching solution.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for recovering acid from a used aqueous etching mixture containing HF, $HNO_3$, $H_2SiF_6$ and $HNO_2$ derived from purifying polycrystalline silicon, comprising progressively distilling the used aqueous etching mixture in a first step such that approximately 20 to 50 wt. % of the used aqueous etching mixture is distilled off as dilute acid in a first fraction, the dilute acid containing more than 90 wt. % of the silicon in the used aqueous etching mixture as hexafluorosilicic acid, the water contained in the used aqueous etching mixture being reduced by approximately 10-30 wt. % to form a water-depleted mixture, and distilling a second fraction from the water-depleted mixture in a second step until a residue of about 1-5 wt. % of the initial amount of used aqueous etching mixture is obtained, and disposing of the remainder of the residue.

2. The method of claim 1, wherein the distillation is carried out in the first step over a period of from 5 to 90 min at a temperature of from 100 to 200° C.

3. The method of claim 2, wherein the distillation is carried out in the second step over a period of from 2 to 80 min at a temperature of from 100 to 180° C.

4. The method of claim 2, wherein the used aqueous etching mixture contains from 40.5 to 53.9 wt. % water, 40-50 wt. % $HNO_3$, from 0.1 to 1.5 wt. % $HNO_2$, 5-6 wt. % HF and 1-2 wt. % Si in the form of $H_2SiF_6$, and impurities which have been introduced into the used aqueous etching solution by etching the silicon.

5. The method of claim 2, wherein the dilute acid obtained in the first step comprises an aqueous mixture of HF, $HNO_3$ and $H_2SiF_6$ with an $HNO_3$ content <40 wt. % and a silicon content of 90 wt. % of the initial silicon content in the used aqueous etching mixture.

6. The method of claim 2, wherein the second fraction comprises a HF and $HNO_3$ mixture with an $HNO_3$ content >55 wt. % and a silicon content of less than 1 wt. %.

7. The method of claim 1, wherein the distillation is carried out in the second step over a period of from 2 to 80 min at a temperature of from 100 to 180° C.

8. The method of claim 7, wherein the used aqueous etching mixture contains from 40.5 to 53.9 wt. % water, 40-50 wt.

% $HNO_3$, from 0.1 to 1.5 wt. % $HNO_2$, 5-6 wt. % HF and 1-2 wt. % Si in the form of $H_2SiF_6$, and impurities which have been introduced into the used aqueous etching solution by etching the silicon.

9. The method of claim 7, wherein the dilute acid obtained in the first step comprises an aqueous mixture of HF, $HNO_3$ and $H_2SiF_6$ with an $HNO_3$ content <40 wt. % and a silicon content of 90 wt. % of the initial silicon content in the used aqueous etching mixture.

10. The method of claim 7, wherein the second fraction comprises a HF and $HNO_3$ mixture with an $HNO_3$ content >55 wt. % and a silicon content of less than 1 wt. %.

11. The method of claim 1, wherein the used aqueous etching mixture contains from 40.5 to 53.9 wt. % water, 40-50 wt. % $HNO_3$, from 0.1 to 1.5 wt. % $HNO_2$, 5-6 wt. % HF and 1-2 wt. % Si in the form of $H_2SiF_6$, and impurities which have been introduced into the used aqueous etching solution by etching the silicon.

12. The method of claim 11, wherein the dilute acid obtained in the first step comprises an aqueous mixture of HF, $HNO_3$ and $H_2SiF_6$ with an $HNO_3$ content <40 wt. % and a silicon content of 90 wt. % of the initial silicon content in the used aqueous etching mixture.

13. The method of claim 11, wherein the second fraction comprises a HF and $HNO_3$ mixture with an $HNO_3$ content >55 wt. % and a silicon content of less than 1 wt. %.

14. The method of claim 1, wherein the dilute acid obtained in the first step comprises an aqueous mixture of HF, $HNO_3$ and $H_2SiF_6$ with an $HNO_3$ content <40 wt. % and a silicon content of 90 wt. % of the initial silicon content in the used aqueous etching mixture.

15. The method of claim 14, wherein the second fraction comprises a HF and $HNO_3$ mixture with an $HNO_3$ content >55 wt. % and a silicon content of less than 1 wt. %.

16. The method of claim 1, wherein the second fraction comprises a HF and $HNO_3$ mixture with an $HNO_3$ content >55 wt. % and a silicon content of less than 1 wt. %.

17. A method for purifying polycrystalline silicon, comprising purifying by prepurification and main purification with an etching mixture containing HF and $HNO_3$, wherein first and second fractions from distillation of a used aqueous etching mixture are prepared by progressively distilling a used aqueous etching mixture containing HF, $HNO_3$, $H_2SiF_6$ and $HNO_2$ in a first step such that approximately 20 to 50 wt. % of the used aqueous etching mixture is distilled off as dilute acid in a first fraction, the dilute acid containing more than 90 wt. % of the silicon in the used aqueous etching mixture as hexafluorosilicic acid, the water contained in the used aqueous etching mixture being reduced by approximately 10-30 wt. % to form a water-depleted mixture, and distilling a second fraction from the water-depleted mixture in a second step until a residue of about 1-5 wt. % of the initial amount of used aqueous etching mixture is obtained, the second fraction comprising an a HF and $HNO_3$ mixture with an $HNO_3$ content >55 wt. % and a silicon content of less than 1 wt. %, and contacting polycrystalline silicon with the second fraction in the main purification of the polycrystalline silicon.

18. The method of claim 17, further comprising prepurifying the polycrystalline silicon with the dilute acid obtained in the first fraction.

19. The method of claim 17, wherein the distillation in the first step is carried out over a period of from 5 to 90 minutes at a temperature of from 100° C. to 200° C., the distillation in the second step is carried out over a period of from 2 to 80 minutes at a temperature of from 100° C. to 180° C., and wherein the second fraction comprises an HF and $HNO_3$ mixture with $HNO_3$ content >55 wt. % and a silicon content of less than 1%.

20. The method of claim 17, wherein additional HF and $HNO_3$ are added to the second fraction.

* * * * *